Nov. 28, 1939.   M. S. GRAVES   2,181,271
BRAKE
Filed July 7, 1936

Inventor
MARK S. GRAVES
By
Attorney

Patented Nov. 28, 1939

2,181,271

UNITED STATES PATENT OFFICE 2,181,271

BRAKE

Mark S. Graves, Los Angeles, Calif.

Application July 7, 1936, Serial No. 89,359

2 Claims. (Cl. 188—81)

This invention relates to a brake of the character employed in combination with a driven shaft for automatically preventing retrograde rotation of the shaft while permitting forward rotation thereof, and more particularly pertains to the type of safety brakes set forth in my copending application for United States Letters Patent Ser. No. 3,661, filed January 26, 1935, now Patent No. 2,061,029 issued Nov. 17, 1936.

An object of the invention is to provide a brake of the above character composed of few parts of simple construction and easy assembly, and which embodies a brake shoe arranged between a revoluble shaft and a fixed wall encircling the shaft and in which the brake element is loosely supported and full floating thus obviating the use of pivot pins and similar mountings.

Another object is to provide a brake in association with a revoluble shaft for normally holding the shaft against retrograde rotation, in which a wide area of frictional engagement with the shaft under a wedge action will be effected immediately on the slightest tendency of backward turning of the shaft so as to arrest such movement with a minimum of wear of the brake.

A further object is to provide an effective means for placing the brake out of operative relation to the shaft.

With the foregoing objects in view together with such other objects and advantages as may subsequently appear, the invention is carried into effect as illustrated in the accompanying drawing, in which.

Figure 1:
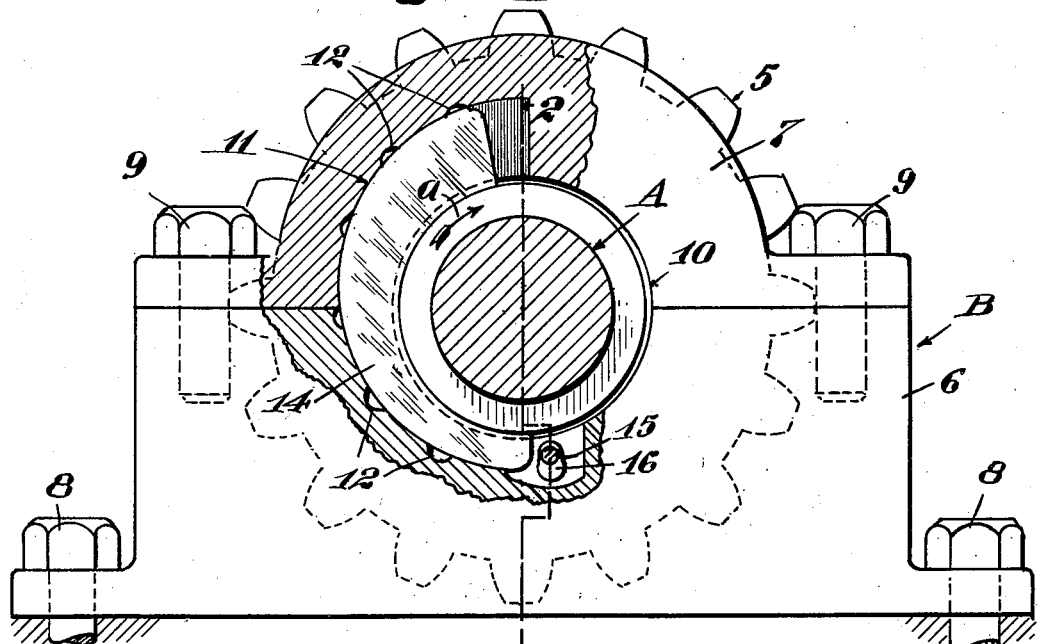
Fig. 1 is a view in elevation, with portions broken away, of the brake as applied and as seen in the direction of the length of a shaft with which it is associated.
Figure 2:
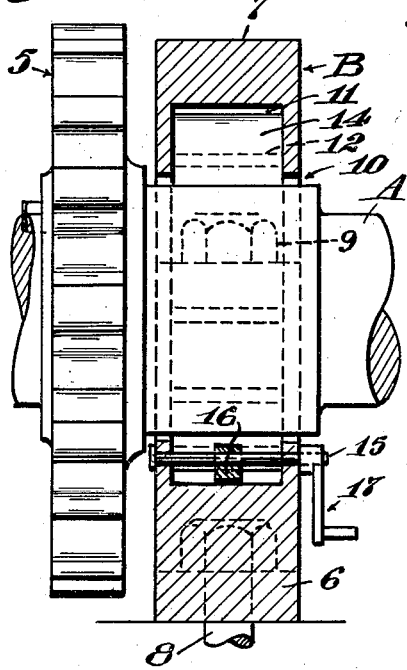
Fig. 2 is a detail in section and elevation taken on the line 2—2 of Fig. 1.
Figure 3:
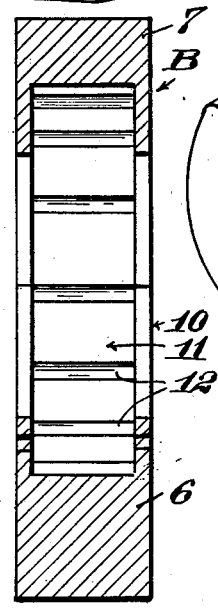
Fig. 3 is a view in section corresponding to that of Fig. 2 showing the fixed wall with the movable parts removed.
Figure 4:
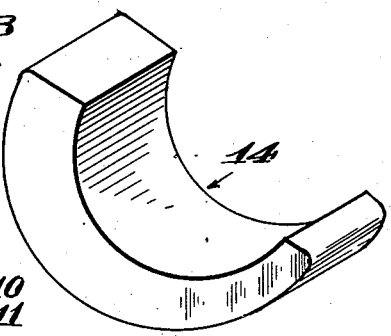
Fig. 4 is a detail in perspective of the brake shoe.

Referring to the drawing more specifically, A indicates generally a driven shaft revolubly mounted in suitable bearings, (not shown) and which is here depicted as fitted with a gear 5 by which the shaft may be rotated from any suitable source of power. Encircling the shaft A is a fixed wall B which may be of any suitable construction and here shown as formed of separable sections 6 and 7; the section 6 constituting a base extending beneath the shaft and which may be affixed to a suitable support as by bolts 8, and the section 7 comprising a cap which extends over the shaft A and is detachably affixed to the section 6 as by bolts 9. The wall B is formed with a circular opening 10 through which the shaft A extends the margin of which opening is arranged in close proximity to but spaced from the shaft. At one side of the opening 10 there is provided in the edge of the wall B forming the margin of the opening, an arcuate channel 11 which extends circumferentially of the opening and increases in depth in a clockwise direction as viewed in Fig. 1; the channel having its greatest depth at the top of the opening 8 and its shallowest portion at the bottom of the opening.

The upper enlarged portion of the channel 11 is formed in the cap 7 and the lower reduced portion is formed in the base 6. The channel 11 is of general rectangular cross section throughout and is formed on its bottom wall with a series of transverse grooves 12 which serve to reduce the area of the bearing surface afforded by the bottom wall of the channel and also as receptacles for a lubricant.

Arranged in the channel 11 is a floating arcuate wedge 14 contoured to conform to the general contour of the channel 11 being thickest at its upper end and tapering to a thinner lower end. The wedge 14 has the convex face thereof in sliding contact with the concave bottom wall of the channel while the concave face of the wedge 14 is in contact with the peripheral portion of the shaft A; the wedge 14 normally gravitating downwardly in the channel to a seated position against the shaft A. As here shown the wedge 14 is of a length to extend approximately one-half the circumference of the shaft A and the channel 11 exceeds the length of the wedge to provide a clearance at each end thereof; the large end of the channel being spaced from the adjacent end of the wedge to permit upward movement thereof and forming a stop shoulder to limit such movement.

In equipping a shaft with the safety brake, the lower section 6 of the wall B is fixed in position beneath the shaft A and the wedge 14 is positioned with its reduced end portion extending into the portion of the channel 11 formed on the base 6 and with the wedge seating against the shaft A. The cap 7 is then applied over the shaft with the upstanding upper end portion of the wedge 14 extending into the portion of the channel 11 formed in the cap, whereupon the cap is affixed to the base 6 by bolt 9. The wedge will then be disposed in sliding engagement with the back wall of the channel 11 and will seat under the action of gravity on the shaft A in frictional contact therewith. In some instances the frictional relation between the wedge and the shaft may be enhanced by roughening the peripheral portion thereof where extending through the wall B.

Previous to effecting assemblage of the parts as above recited, a quantity of lubricant may be applied to the bottom of the channel 11 to fill the grooves 12.

It will be manifest that assemblage of the parts may be easily accomplished, and it will be apparent that with the parts formed and arranged as described the shaft A may rotate freely in a direction leading along the inner face of the wedge 14 from the reduced end toward the enlarged end thereof, as indicated by the arrow $a$ in Fig. 1, but upon reverse rotation of the shaft the wedge 14 will be caused to automatically move downwardly and inwardly by reason of its weight and free mounting and also under the urge of frictional engagement of shaft A therewith and thus set up a binding action on the shaft A which will prevent further retrograde or reverse movement of the shaft.

Greater simplicity of structure is attained, and a more efficient use of gravity secured in controlling the action of the wedge, by reason of the fact that a single, arcuate wedge is employed of a sufficient size to act upon not less than approximately a semi-circumference of the cylindrical shaft portion with which it cooperates.

Since there may be occasions when it will be necessary to effect retrograde rotation of the shaft A, means are provided for temporarily placing the wedge 14 out of operative relation with the shaft A, which means is here shown as embodying a rock shaft 15 extending transversely across the lower end portion of the channel 11 in spaced relation to the lower end of the wedge 14 on which shaft is fitted a cam 16 so arranged that on rotation of the shaft 15 the cam 16 will be brought into sliding contact with the lower reduced end of the wedge 14 and will act to lift the latter out of frictional engagement with the shaft A.

By rocking the shaft 15 in a clockwise direction from the position thereof shown in Fig. 1 through approximately 120 degrees the cam 16 will be caused to impart a releasing movement to the wedge 14 and then to assume an upwardly inclined position wherein it is releasably locked in the angle between the lower side of the shaft 10 and the lower end of the wedge.

I claim:

1. In combination with a driven shaft, a fixed wall surrounding the shaft formed with a tapered channel having its large end located adjacent the upper portion of the shaft and its small end at the lower portion of the shaft, a curved wedge located in said channel slidably contacting the bottom wall thereof and bearing on said shaft under the action of gravity, said wedge having its inner face concentric with and conforming to the periphery of the shaft, a cam in the lower end portion of said channel arranged to bear against the reduced end of said wedge, and a rock shaft carrying said cam, said cam normally occupying a downwardly directed position in relation to said rock shaft and being swingable laterally by said shaft against an ajacent face on the small end of said wedge.

2. The subject matter of the preceding claim and, said cam and rock shaft being so positioned in relation to the adjacent edge of said wedge when the latter is in its lowermost position that a sufficient rocking of said cam toward and across said wedge will impart a releasing movement to the wedge and will then maintain said cam releasably locked in an upwardly inclined position by reason of the wedge gravitating downwardly thereagainst.

MARK S. GRAVES.